(12) United States Patent
Chan

(10) Patent No.: US 10,209,815 B2
(45) Date of Patent: Feb. 19, 2019

(54) TOUCH SCREEN CONTROL AND DISPLAY CIRCUIT AND METHOD ALTERNATING A FRAME UPDATE MODE AND A TOUCH SENSING MODE

(71) Applicant: ILI TECHNOLOGY CORP., Hsinchu County (TW)

(72) Inventor: Ping-Yu Chan, Hsinchu Hsien (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 180 days.

(21) Appl. No.: 15/154,216

(22) Filed: May 13, 2016

(65) Prior Publication Data

US 2016/0334923 A1     Nov. 17, 2016

(30) Foreign Application Priority Data

May 15, 2015 (TW) .............................. 104115568 A

(51) Int. Cl.
*G06F 3/044* (2006.01)
*G06F 3/041* (2006.01)
*G09G 3/36* (2006.01)

(52) U.S. Cl.
CPC .......... *G06F 3/0416* (2013.01); *G06F 3/0412* (2013.01); *G09G 3/3677* (2013.01); *G06F 3/044* (2013.01); *G09G 2310/0286* (2013.01)

(58) Field of Classification Search
CPC .... G06F 1/3262; G06F 3/0412; G06F 3/0416; G09G 5/393; G09G 3/3677; G09G 2310/0286
See application file for complete search history.

(56) References Cited

U.S. PATENT DOCUMENTS

| 2008/0162751 | A1* | 7/2008 | Wilson | G06F 3/0416 710/52 |
| 2011/0267326 | A1* | 11/2011 | Kim | G09G 3/3677 345/211 |
| 2012/0019454 | A1* | 1/2012 | Huang | G06F 3/0412 345/173 |

(Continued)

FOREIGN PATENT DOCUMENTS

CN    104240653    12/2014

OTHER PUBLICATIONS

State Intellectual Property Office of the People's Republic of China, "Office Action", dated May 18, 2018.

*Primary Examiner* — Jennifer Mehmood
*Assistant Examiner* — James S Nokham
(74) *Attorney, Agent, or Firm* — JCIPRNET

(57) ABSTRACT

A touch control and display control module of a touch screen includes (n×y) rows of sensing units disposed on a substrate. The touch control and display control module includes: a control circuit, controlling the touch screen to operate in one of a frame update mode and a touch sensing mode; and n first control lines, y second control lines and n control signal output circuits disposed on the substrate. Each control signal output circuit is coupled to one of the n first control line, and includes y control signal buffer units. Each control signal buffer units is coupled to one of the y second control lines and sensing units of one row to output a voltage signal to the sensing units of that row, to cause the sensing units of that row to operate in one of the frame update mode and the touch sensing mode.

18 Claims, 12 Drawing Sheets

(56) References Cited

U.S. PATENT DOCUMENTS

| | | | |
|---|---|---|---|
| 2012/0044195 A1* | 2/2012 | Nakanishi | G06F 3/0412 345/174 |
| 2012/0105338 A1* | 5/2012 | Lin | G06F 3/0416 345/173 |
| 2013/0127779 A1* | 5/2013 | Lillie | G06F 3/0416 345/174 |
| 2014/0232664 A1* | 8/2014 | Henry | G06F 3/0412 345/173 |
| 2014/0327646 A1* | 11/2014 | Yeh | G06F 1/3262 345/174 |
| 2015/0194137 A1* | 7/2015 | Wyatt | G09G 5/393 345/173 |
| 2016/0300523 A1* | 10/2016 | Tan | G06F 3/0412 |

* cited by examiner

TOUCH SCREEN CONTROL AND DISPLAY CIRCUIT AND METHOD ALTERNATING A FRAME UPDATE MODE AND A TOUCH SENSING MODE

This application claims the benefit of Taiwan application Serial No. 104115568, filed May 15, 2015, the subject matter of which is incorporated herein by reference.

BACKGROUND OF THE INVENTION

Field of the Invention

The invention relates in general to a touch control and display circuit and a touch control and display control module of a touch screen, and a method for controlling a touch screen, and more particularly to a touch control and display circuit and a touch control and display control module of a touch screen, and a method for controlling a touch screen in which touch electrodes share transistors in a liquid crystal display (LCD) substrate.

Description of the Related Art

FIG. 1 shows a schematic diagram of a conventional liquid crystal display (LCD) module 100. A display region 110 of the LCD module 100 is formed by a plurality of pixels, each of which driven by more than one thin-film transistor (TFT). A TFT array of the display region 110 is manufactured on a glass substrate, and the display region 110 is surrounded by a plurality of n gate driver integrated circuits (ICs) 120-1 to 120-n and m source driver ICs 130-1 to 130m, where n and m are positive integers. The gate driver ICs 120 and the source driver ICs 130, primarily ICs manufactured by a CMOS fabrication process, are connected by external means to the TFT array instead of being manufactured on the glass substrate. The gate driver ICs 120 control the turning on and off of the TFTs, and the source driver ICs 130 provide pixel data associated with each of the pixels to each of the pixels. FIG. 2 shows a circuit diagram of a TFT of a pixel and a capacitor connected to the TFT. The gate of the TFT 210 receives a gate control signal G outputted by the gate driver IC 120, and the gate of the TFT 210 receives pixel data DATA outputted by the source driver IC 130. When the TFT 210 is turned on, the capacitor 220 is charged to a voltage corresponding to the pixel data DATA, and the TFT 210 is controlled by a gate control signal G to become turned off after the capacitor 220 is fully charged. At this point, the capacitor 220 stores voltage information corresponding to the TFT 210. The gate driver IC 120 sequentially turns on each of the TFTs 210 to cause the capacitor 220 coupled thereto to charge the voltage of the corresponding pixel data DATA, so as to adjust the amount of the light penetration of each of the pixels of the LCD module 100 to further allow the display region 110 to display a complete image frame.

With the blooming touch control technologies in the recent years, more and more display apparatuses support a touch control function, and so an LCD module is frequently incorporated with a touch panel to simultaneously provide display and touch control functions. A common solution is to manufacture the touch panel independently as a layer adhered above the LCD module. However, such method increases both manufacturing processes and production costs. In another way, the TFT array of the LCD module serves as one type of sensing electrode (e.g., as a transmitter) of the touch panel, and another type of sensing electrode (a receiver) is manufactured at a different layer on the LCD module. In the above method, a touch event is detected in a blanking interval in which the gate driver ICs 120 are not updating pixel information (e.g., the voltage information stored in the capacitor 220) of the entire display region 110, or touch sensing is performed during intervals between the pixel data of the entire display region 110 is updated. When touch sensing is performed, the gate driver ICs 120 apply a sensing voltage on the gate of the TFTs, and estimate information such as position and time of a touch event through detecting capacitance changes between the sensing electrodes of the transmitter and the sensing electrodes of the receiver by a touch sensing IC. However, the above method suffers from a drawback. More specifically, the capacitor 220 of the TFT 210 is already charged to the target voltage corresponding to the pixel data DATA after the frame is completely updated, and the voltage of the capacitor 220 is changed as the TFT 210 is again turned on in the blanking interval to cause a distortion in the image frame. Further, because the gate driver ICs 120 turn on the TFTs 210 of each row by sequentially scanning the gate lines (one row of the TFT array), the capacitance change of the sensing electrodes also needs to be detected by a sequentially scanning method during touch sensing, resulting in the lack of flexibilities in touch sensing.

SUMMARY OF THE INVENTION

The invention is directed to a touch control and display circuit and a touch control and display control module of a touch screen, and a control method for a touch screen to increase flexibilities for touch sensing and to prevent image frame distortion. In the present invention, similar to gate-on-array (GOA) technologies, most components and control lines are manufactured on a substrate of a TFT array, thereby reducing manufacturing processes and production costs as well as increasing the integrity of an LCD to achieve narrow borders.

The present invention discloses a touch control and display control module of a touch screen. The touch screen includes (n×y) rows of sensing units manufactured on a substrate, where n and y are positive integers greater than 1. The touch control and display control module includes: a control circuit, controlling the touch screen to operate in one of a frame update mode and a touch sensing mode; n first control lines, manufactured on the substrate, coupled to the control circuit; y second control lines, manufactured on the substrate, coupled to the control circuit; and n control signal output circuits, manufactured on the substrate, each of the n control signal outputting circuits coupled to one of the n first control lines and including y control signal buffer units, each of the y control signal buffer units coupled to one of the y second control lines and the sensing units of one row to output a voltage signal at the sensing units of that row, to cause the sensing units of that row to operate in one of the frame update mode and the touch sensing mode.

The present invention further discloses a touch control and display circuit of a touch screen for controlling image display and touch event sensing. The touch control and display circuit includes: a control module, controlling the touch screen to operate in one of a frame update mode and a touch sensing mode; and a plurality of sensing units, coupled to the control module, arranged in a plurality of rows, each of the sensing units having voltage information associated with an image displayed by the touch screen. When the touch screen operates in the frame update mode, the control module outputs a first group of voltage signals, sequentially controls the sensing units of the same row to be simultaneously turned on in a unit of one row, and turns off all of the sensing units of that row after completely updating the voltage information. When the touch screen operates in the touch sensing mode, the control module outputs a second group of voltage signals to cause the sensing units of a plurality of consecutive rows to simultaneously receive the second group of voltage signals to perform touch sensing. Further, while the sensing units receive the second group of voltage signals, the voltage information of these sensing units is kept unchanged.

The present invention further discloses a control method for a touch screen to control image display and touch event sensing. The touch screen includes a plurality of sensing units arranged in a plurality of rows, and each of the sensing units has voltage information associated with an image displayed by the touch screen. The control method includes: in a frame update mode, generating a first group of voltage signals, sequentially controlling the sensing units of the same row to be simultaneously turned on in a unit of one row; and in a touch sensing mode, generating a second group of voltage signals, and simultaneously transmitting the second group of voltage signals to the sensing units of the plurality of rows to perform touch sensing. The voltage information of these sensing units is kept unchanged while the second group of voltage signals are received.

The touch control and display circuit and the touch control and display control module of a touch screen, and the control method for a touch screen of the present invention, are capable of controlling the gate lines in a grouped manner to enhance flexibilities for touch sensing. Further, in the present invention, the gate lines are provided with different voltage signals in the frame update mode and in the touch sensing mode of the touch screen, hence ensuring that the pixel information that has been updated the frame update mode does not change in the touch sensing mode.

The above and other aspects of the invention will become better understood with regard to the following detailed description of the preferred but non-limiting embodiments. The following description is made with reference to the accompanying drawings.

DETAILED DESCRIPTION OF THE INVENTION

The disclosure of the application includes a touch control and display circuit and a touch control and display control module of a touch screen, and a control method for a touch screen. In possible implementation, one skilled person in the art may choose equivalent elements or steps to implement the disclosure based on the disclosure of the application. That is, the implementation of the disclosure is not limited by the embodiments disclosed in the disclosure.

Figure 1:
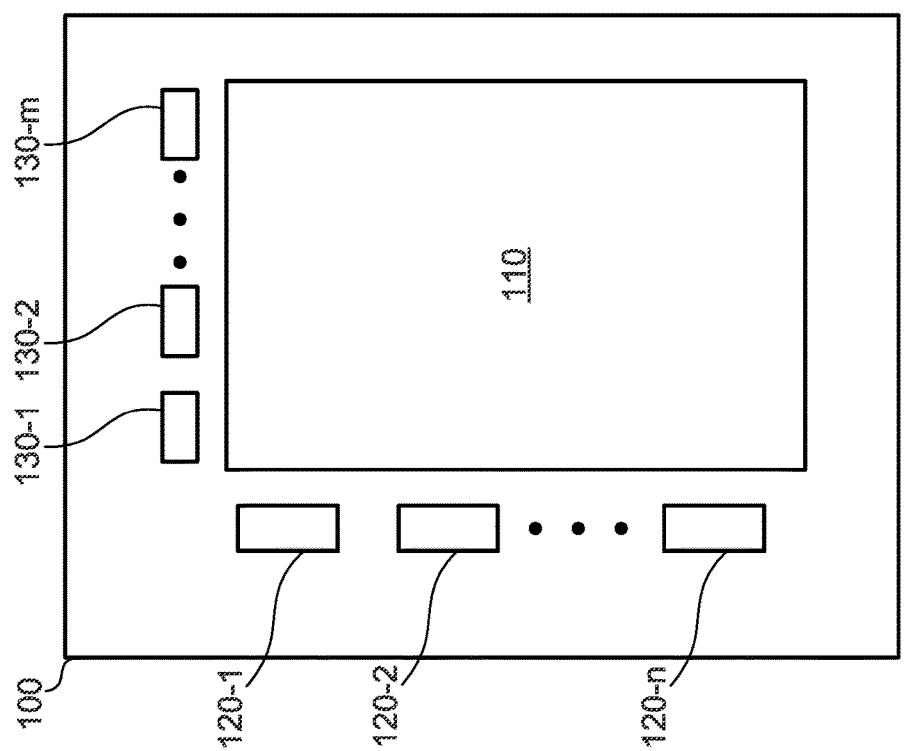
FIG. 1 is a schematic diagram of a conventional liquid crystal display (LCD) module.
Figure 2:
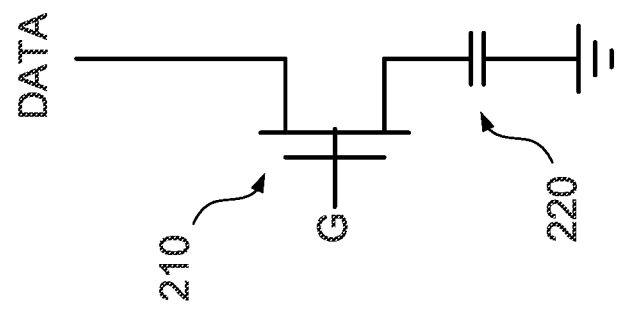
FIG. 2 is a circuit diagram of a thin-film transistor (TFT) of a pixel and a capacitor connected to the TFT.
Figure 3:
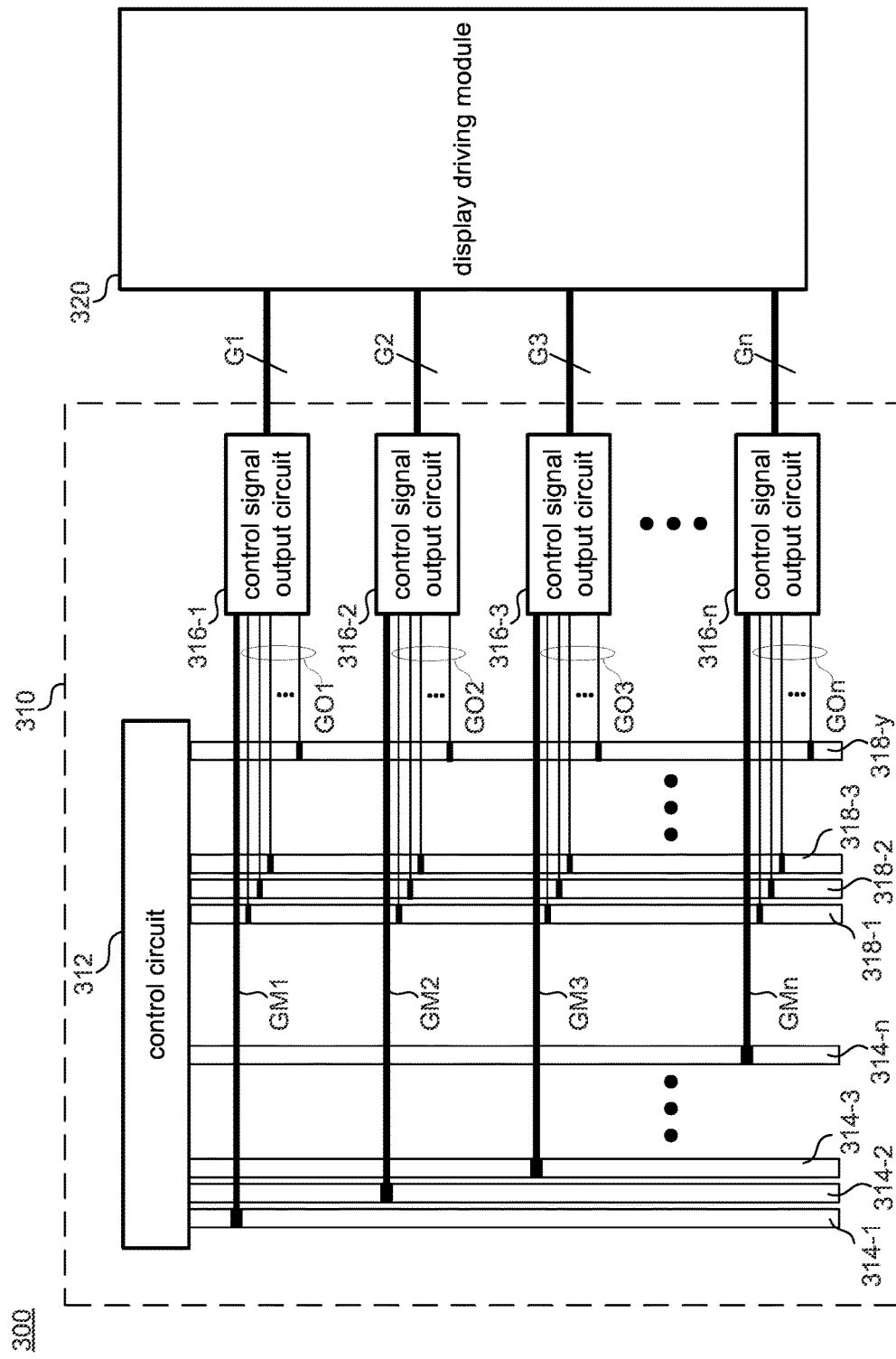
FIG. 3 is a circuit diagram of a touch control and display circuit of a touch screen according to an embodiment of the present invention.
Figure 4:
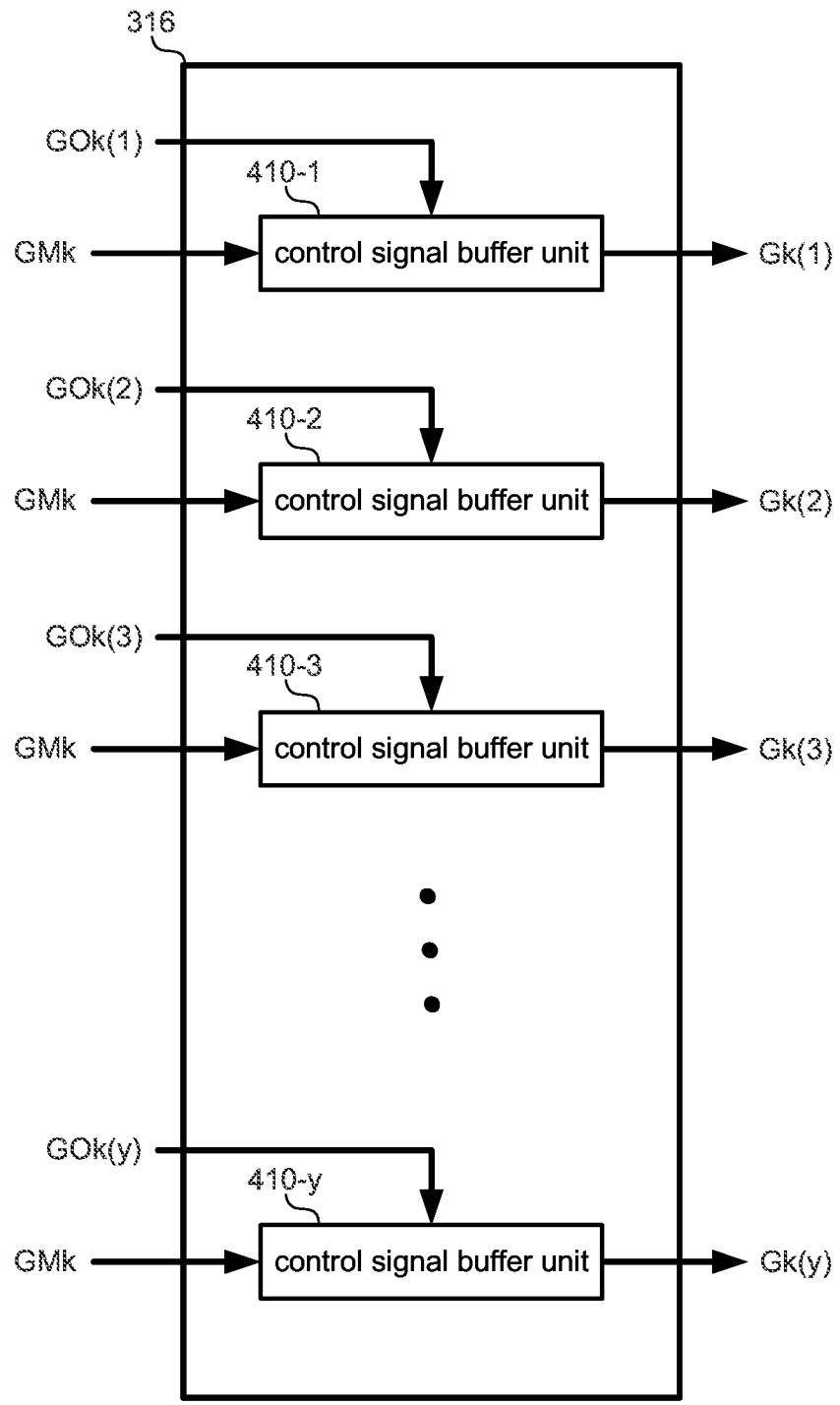
FIG. 4 is a circuit diagram of a control signal output circuit 316 according to an embodiment of the present invention.

FIG. 3 shows a circuit diagram of a touch control and display circuit 300 of a touch screen according to an embodiment of the present invention. The touch control and display circuit 300 of a touch screen includes a touch control and display control module 310 and a display driving module 320. The display driving module 320 includes a thin-film transistor (TFT) array formed by a plurality of TFTs arranged in a plurality of rows. The gates of all of the TFTs of each row are connected to one another to be simultaneously turned on or turned off. Each TFT is coupled to a capacitor that stores voltage information. The TFTs and the capacitors are in charge of displaying an image of the touch screen, and are collectively referred to as sensing units of the touch screen. The gates of these sensing unit serve as a signal layer of touch sensing. The touch function is realized through receiving signals obtained by the sensing layer of the touch screen. For example, the sensing layer may be made of a conductive material such as indium tin oxide (ITO) or a metal, and may be disposed at different layers of the touch screen according to actual requirements. Such details are generally known to one person skilled in the art, and shall be omitted herein. The touch control and display control module 310 includes a control circuit 312, n first control lines 314-1 to 314-$n$ (where n is a positive integer greater than 1), y second control lines 318-1 to 318-$y$ (where y is a positive integer greater than 1), and n control signal output circuits 316-1 to 316-$n$. The control circuit 312 transmits n switch signals GM1 to GMn through the n first control lines 314-1 to 314-$n$ to the n control signal output circuits 316-1 to 316-$n$, respectively, and further generates n groups of voltage signal sets GO1 to GOn through the y second control lines 318-1 to 318-$y$ to the n control signal output circuits 316-1 to 316-$n$, respectively. Referring to FIG. 4, for each of the control signal output circuits 316-$k$, each group of voltage signal set GOk (where k is an integer among 1 to n) includes y voltage signals GOk(1) to GOk(y). Each group of voltage signal set GOk is connected before the corresponding control signal output circuit 316-$k$, and each voltage signal GOk(m) (where m is an integer among 1 to y) is transmitted by one of the second control lines 318-$m$ parallel to the n first control lines 314-1 to 314-$n$. That is to say, there are a total of y second control lines 318-1 to 318-$y$ parallel to the n first control lines 314-1 to 314-$n$. The control signal output circuit 316 outputs the voltage signal set GOk to the gates of the TFT array of the display driving module 320 according to the control of the switch signal GMk to control the turning on and turning off of the TFT array. In an embodiment of the present invention, components of the touch control and display control module 310, except the control circuit 312, are together manufactured with the display driving module 320 on a glass substrate. One main purpose of the touch control and display control module 310 is to replace the function of the conventional gate driver IC 120. More specifically, similar to gate-on-array (GOA) technologies, most components of the touch control and display control module 310 are manufactured on the substrate of the TFT array to provide the TFT array with control and voltage signals required. For example, the control signal output circuit 316 may be implemented by a TFT, and is at the same time manufactured on the same glass substrate as the TFT array of the display driving module 320. Further, the first control lines 314 and the second control lines 318 may also be manufactured on the glass substrate. Thus, compared to the conventional gate driver IC 120 that is manufactured outside the glass substrate, not only the circuit of the present invention is relatively simple, but also the control circuit of the TFT array manufactured by such method helps reduce manufacturing processes and production costs and enhances the integrity of the LCD panel. Further, through the design of the present invention, effectively through merely the n first control lines 314 and the y second control lines 318, i.e., a total of (n+y) vertical control lines, a total of (n×y) gate lines of the TFTs included in the display driving module 320 are controlled. That is to say, the present invention is capable of effectively reducing the horizontal width of the display control module 310 based on the GOA technologies to achieve an effect of narrow borders.

Figure 5B:
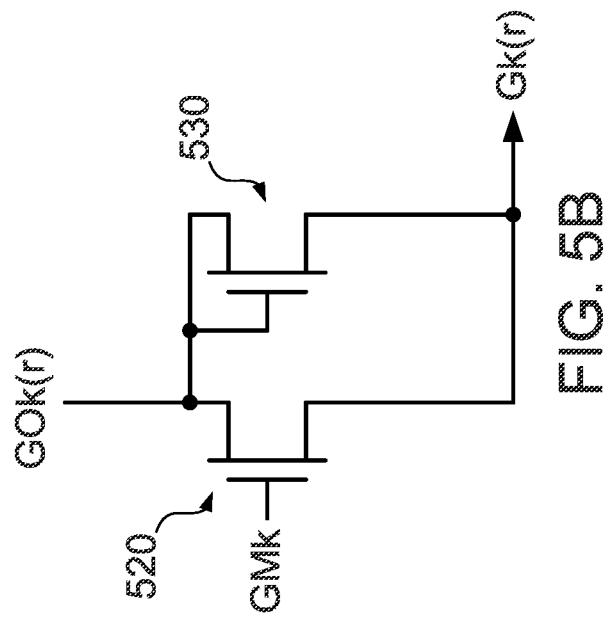
FIG. 5A and FIG. 5B are circuit diagrams of a control signal buffer unit 410 according to different embodiments of the present invention.
Figure 5A:
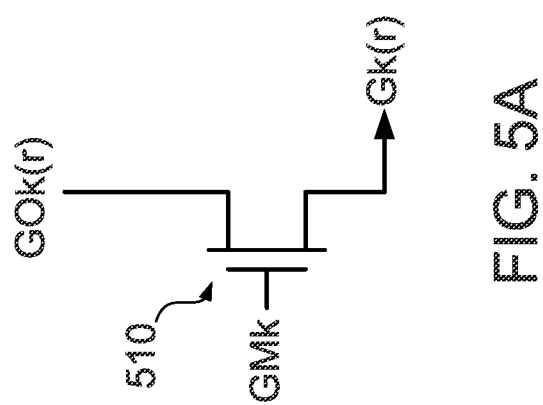

FIG. 4 shows a circuit diagram of the control signal output circuit 316 according to an embodiment of the present invention. Taking the $k^{th}$ control signal output circuit 316 for example, it includes y control signal buffer units 410-1 to 410-y. Each of the control buffer units 410 receives the $k^{th}$ switch signal GMk and one of the $k^{th}$ group of voltage signal set (i.e., y voltage signals GOk(1) to GOk(y) included in the voltage signal set GOk) that the control circuit 312 sends, and generates the control signal Gk(r), where r is a positive integer between 1 and y. One main function of the control signal buffer units 410 is to output the voltage signal GOk(r) as the control signal 20 Gk(r) according to the control of the switch signal GMk. The control signal Gk(r) controls the turning on and turning off of all of the TFTs on one of the gate lines of the TFT array of the display driving module 320. FIG. 5A and FIG. 5B are circuit diagrams of the control signal buffer unit 410 according to different embodiments of the present invention. In the embodiment in FIG. 5A, the control signal buffer unit 410 is implemented by an independent TFT 510. The TFT 510 has its gate coupled to the switch signal GMk, its drain receive the voltage signal GOk(r), and its source output the control signal Gk(r). Thus, through the switch signal GMk, the TFT 510 is controlled to be turned on and turned off to output the voltage signal GOk(r) as the control signal Gk(r). In the embodiment in FIG. 5B, in addition to using a TFT 520 as a switch element, a TFT 530 is further adopted as a voltage regulating component to regulate the control signal Gk(r). As shown, the gate and the drain of the TFT 530 are connected to the drain of the TFT 520, and the source of the TFT 530 is connected to the source of the TFT 520. In a preferred embodiment, the TFT 510, the TFT 520, the TFT 530 and the first control lines 314 in FIG. 3 are all made of a transparent electrode material of ITO, and are manufactured on the glass substrate of the display driving 15 module 320 but located outside the display driving module 320. As the TFT array of the display driving module 320 adopts the same material and manufacturing method, manufacturing processes and production costs can be reduced.

The TFT array in the display driving module 320 in FIG. 3 has different scanning methods in different operating modes of the touch screen. The operating modes of the touch screen are fundamentally divided into two types—a frame update mode in which display contents of the screen are updated, and a touch sensing mode in which a touch event is detected. A screen usually updates according to a frame update frequency, e.g., 60 Hz, i.e., the frame is updated once every 16.667 ms. In this 16.667 ms update period, the time for transmitting pixel data accounts for only one part, whereas the remaining part is a blanking interval. For example, the pixel data occupies about 10 ms to 11 ms, and the blanking interval occupies about 5 ms to 6 ms. Thus, in the period of providing pixel data, the touch control and display circuit 300 of the touch screen operates in the frame update mode; in the blanking interval, the touch control and display circuit 300 of the touch screen operates in the touch sensing mode.

Figure 6:
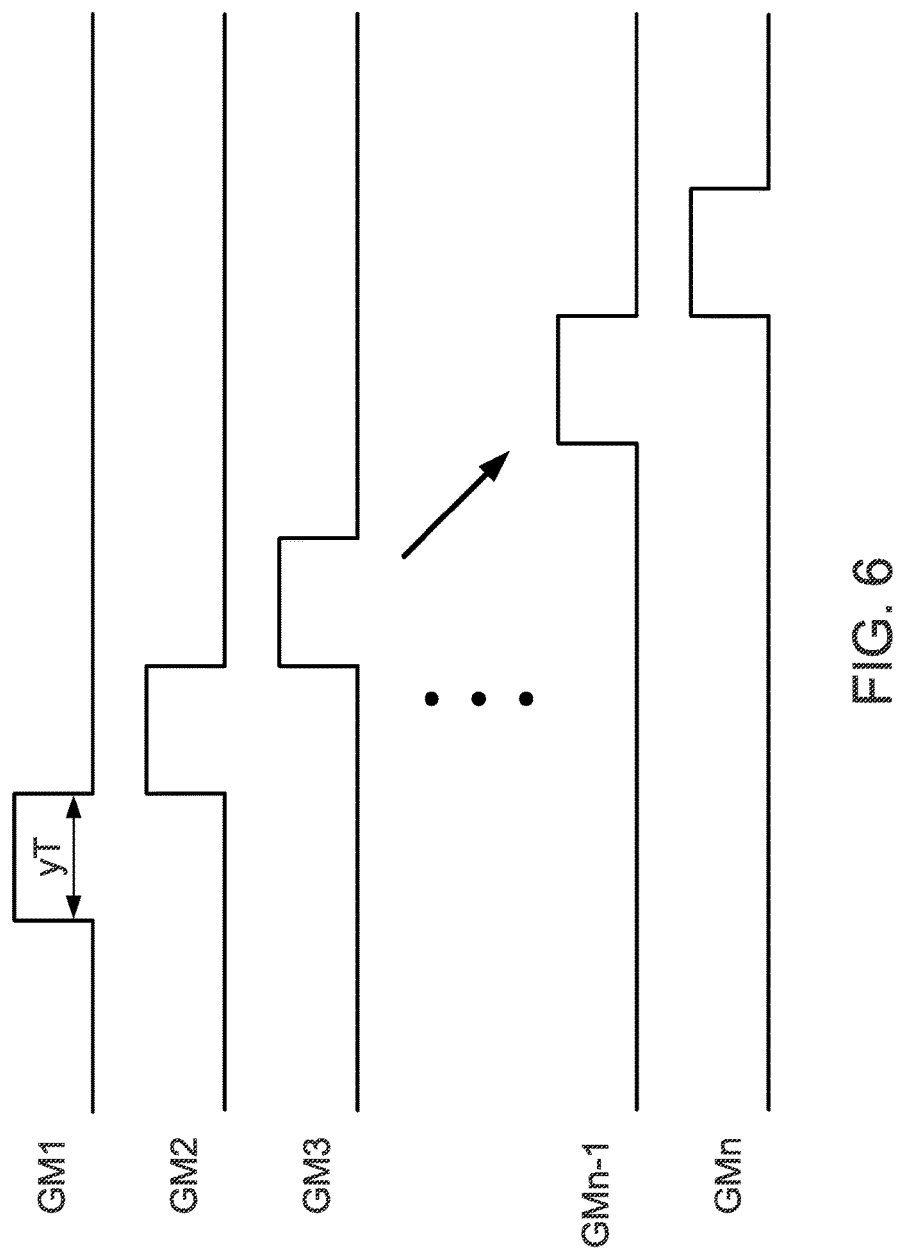
FIG. 6 is a timing diagram of a switch signal GM according to an embodiment of the present invention.
Figure 7:
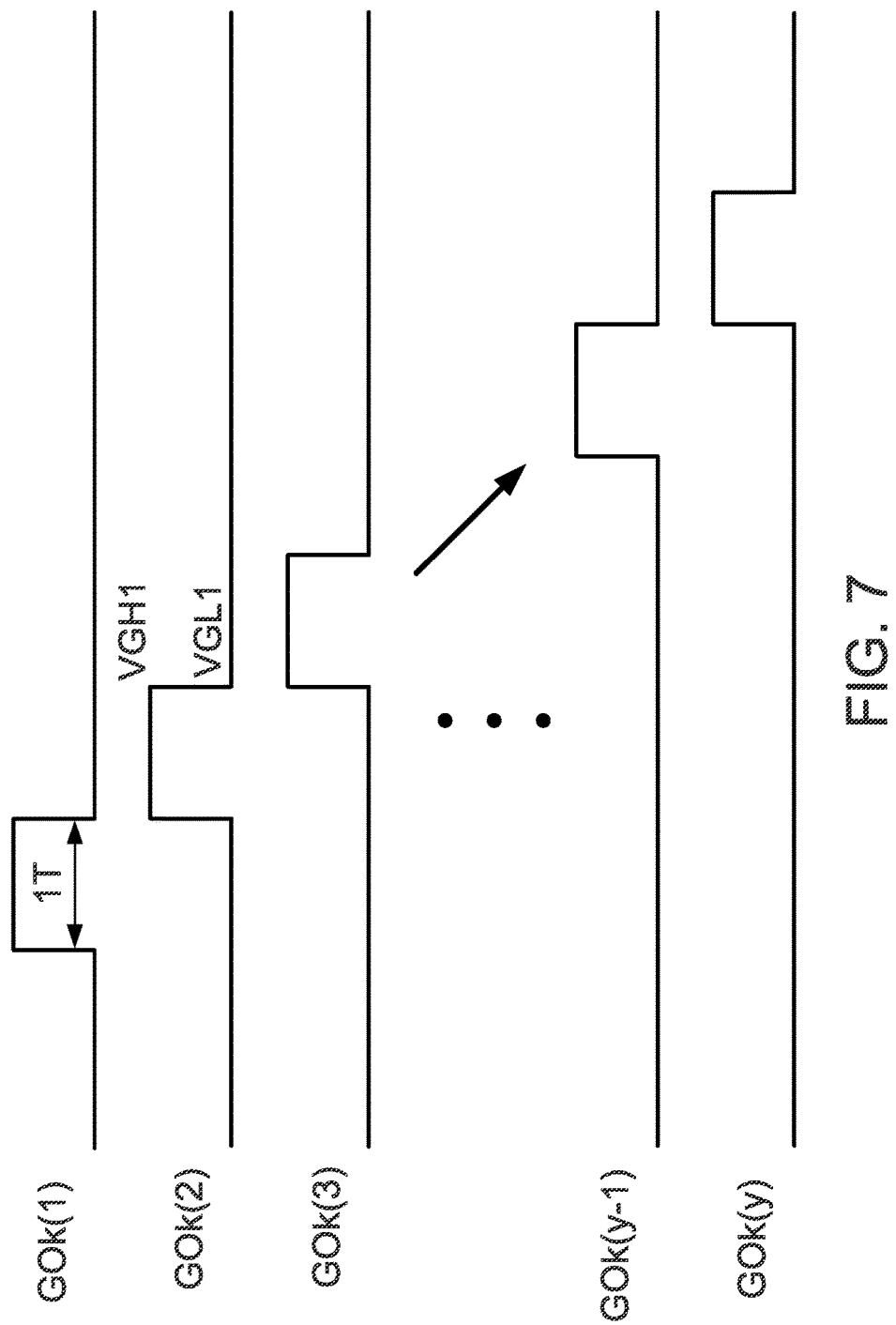
FIG. 7 is a timing diagram of a voltage signal GO of a control output circuit in a frame update mode according to an embodiment of the present invention.

As previously described, one control signal output circuit 316 in FIG. 3 may simultaneously control the turning on and turning off of a plurality of gate lines in the TFT array. Taking an actual number for instance, assuming that the display driving module 320 includes 1080 gate lines that are grouped in every 27 gate lines, the touch control and display control module 310 in FIG. 3 includes 40 first control lines 314 and 40 control output circuits 316. FIG. 6 shows a timing diagram of a switch signal GM according to an embodiment of the present invention. In both of the frame update mode and the touch sensing mode, the control circuit 312 causes the control signal buffer units 410 in the control signal output circuits 316-1 to 316-n to be sequentially turned on in a unit of one group. In the frame update mode, each switch signal GMk is kept at a high level for a period yT, and is kept at a low level in the remaining time. Wherein, y is positive integer, and represents the number of gate lines corresponding to one control signal output circuit 316. In continuation of the above example, at this point, y=27, and n=40. 1T is a reciprocal of a product of the update frequency of the frame and the total number of gate lines. For example, assuming the update frequency is 60 Hz and the total number of gate lines is 1080, 1T=1/(60×1080). FIG. 7 shows a timing diagram of the voltage signal GOk of a control signal output circuit in the frame update mode according to an embodiment of the present invention. As shown, the voltage signals GOk(1) to GOk(y) are sequentially kept at a high level VGH1 for a predetermined period 1T, i.e., the y voltage signals GOk(1) to GOk(y) cause the y gate lines of the same group to be sequentially turned on to update the pixel data. In a preferred embodiment, the high level VGH1 is 18V, and a low level VGL1 is −6V, which cause the TFTs to turn on and turn off, respectively.

The timing diagram in FIG. 6 is also applicable to the touch sensing mode, with the only difference being the time unit. In the touch sensing mode, the period in which each switch signal GMk is kept at a high level is yB. Wherein, 1B represents a quotient of dividing the blanking interval by the total number of gate lines. For example, assuming that the blanking interval is 5 ms and the total number of gate lines is 1080, 1B=5 ms/1080. If the gate lines are divided into 40 groups, the period in which each switch signal GMk is kept at a high level is 27B. That is to say, in the touch sensing mode, the control circuit 312 causes the control signal buffer units 410 in the control signal output circuits 316-1 to 316-$n$ to be sequentially turned on similarly in a unit of one group, with however the length of the period in which the control signal buffer units 410 are turned on is different from that in the frame update mode.

Figure 8:
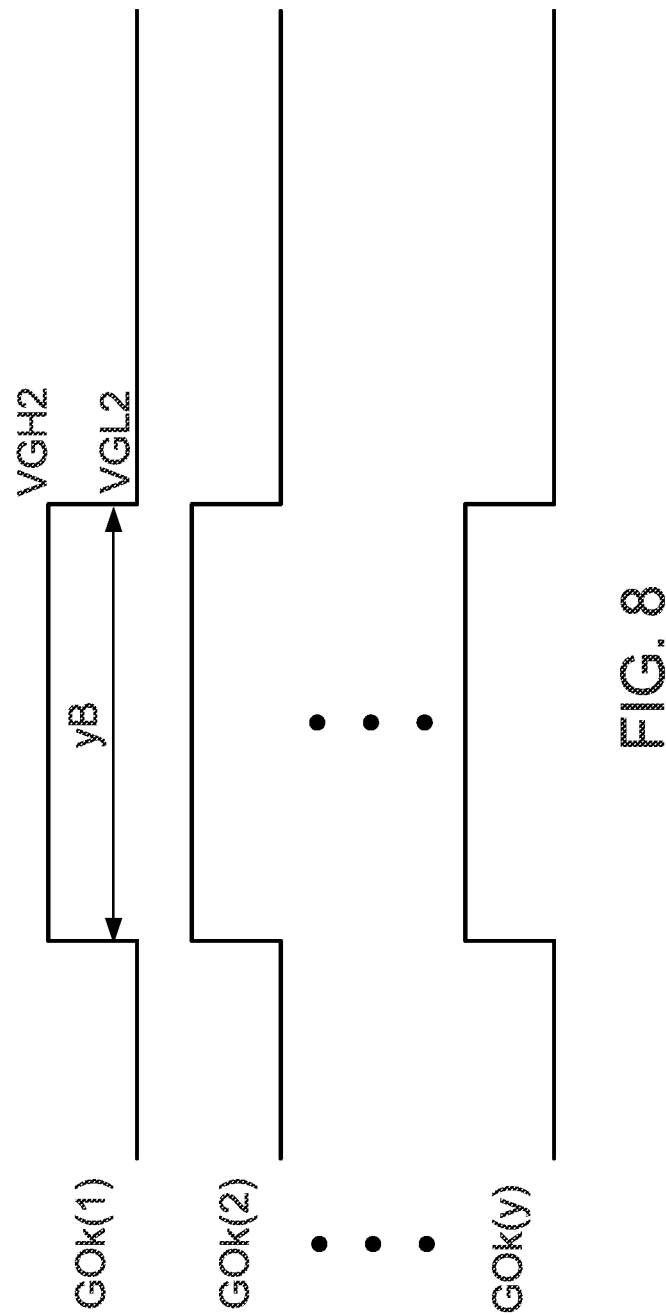
FIG. 8 is a timing diagram of a voltage signal GO of a control output circuit in a touch sensing mode according to an embodiment of the present invention.

FIG. 8 shows a timing diagram of a voltage signal GOk of a control signal output circuit in the touch sensing mode according to an embodiment of the present invention. In the touch sensing mode, the period in which the switch signal GOk is kept at a high level VGH2 is equal to the period in which the corresponding control signal buffer unit 410 is turned on. That is, the control signal buffer units 410 of the same group are turned on for a period yB under the control of the switch signal GMk, and in the same period, the voltage signal GOk is also kept at a high level for the period yB. In other words, each of the gate lines corresponding to the same control signal output circuit 316 is applied by the high voltage level VGH2 for the period yB, meaning that all of the TFTs on these gate lines at this point simultaneously serve as transmitters of a sensing electrode, and the control circuit 312 performs touch sensing through applying a voltage difference (VGH2−VHL2) thereon. The number of gate lines in a group is associated with the fineness of touch sensing. The number of gate lines included in each group is decreased if a higher touch sensing fineness is needed, with however the number of groups being increased (i.e., the number of the control signal output circuits 316 is increased).

Figure 9:
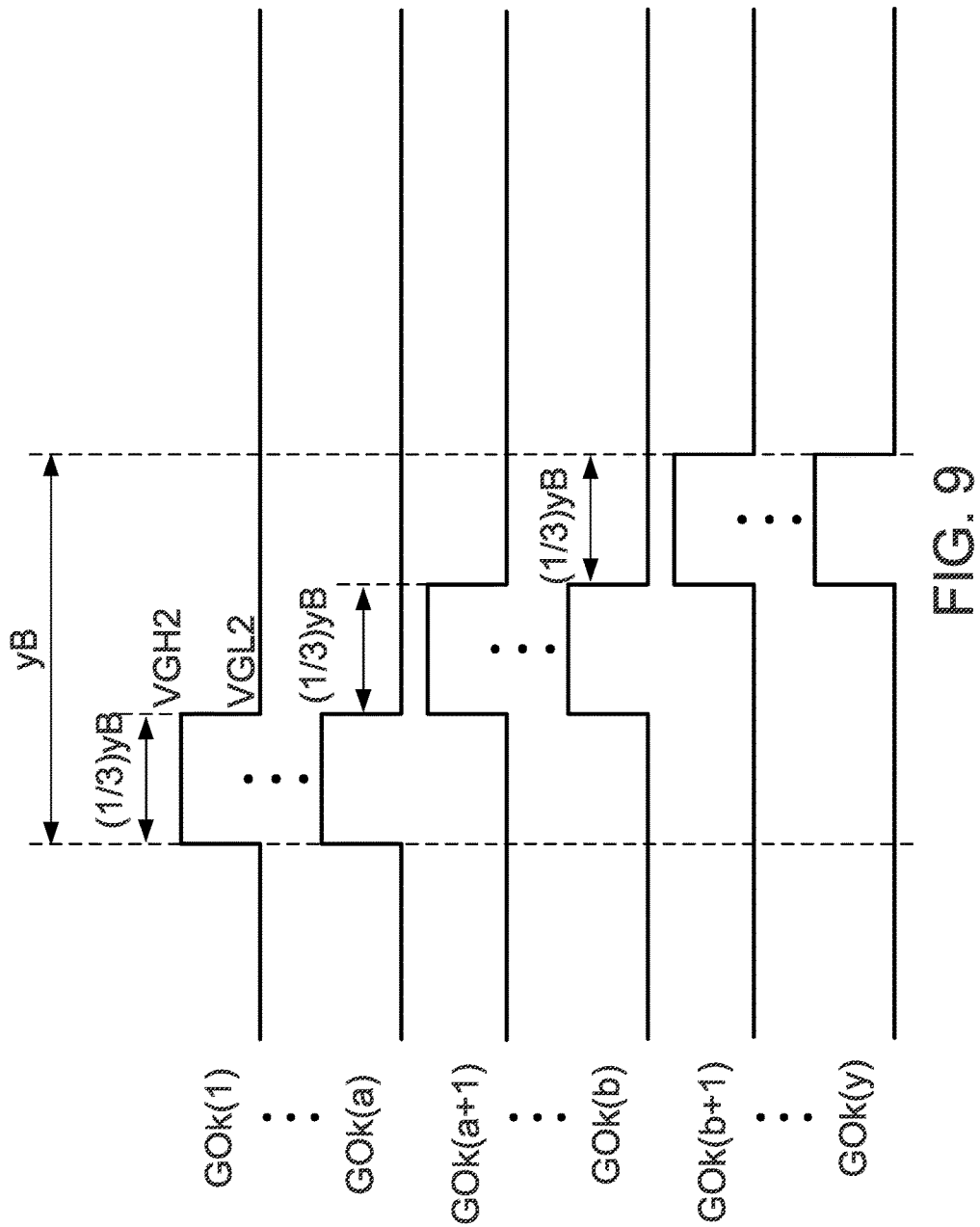
FIG. 9 is a timing diagram of a voltage signal GO of a control signal output circuit in a touch sensing mode according to another embodiment of the present invention.

FIG. 9 shows a timing diagram of the voltage signal GO of a control signal output circuit in the touch sensing mode according to another embodiment of the present invention. In this embodiment, all of the gate lines corresponding to the same control signal output circuit 316 are further divided into three sub-groups, each of which applied by the high voltage level VGH2 for ⅓ period yB. Thus, the period in which the voltage signal GOk is kept at the high level VGH2 is smaller than the period in which the corresponding control signal buffer unit 410 is turned on. That is, the control signal buffer units 410 of one particular control signal output circuit are turned on for the yB period under the control of the switch signal GMk, and in the same period, the voltage signal GOk is kept at the high level VGH2 for a period that is smaller than yB. In other words, during the period in which the control signal buffer units 410 are turned on, there is a change in the level of the voltage signal GOk. All of the TFTs of the gate lines of the same sub-group simultaneously serve as transmitters of the sensing electrodes, and the control circuit 312 performs touch sensing through applying a voltage thereon. Taking actual numbers for instance, assuming that y=27, the $1^{st}$ to the $9^{th}$ (a=9) gate lines in this group are a $1^{st}$ sub-group, and all of the TFTs thereon are applied by the high voltage level VGH2 for a total period of 9B. Similarly, the $10^{th}$ to the $18^{th}$ gate lines (i.e., b=18) and the $19^{th}$ to the $27^{th}$ gate lines are respectively the $2^{nd}$ group and the $3^{rd}$ group, with respective TFTs also applied by the high voltage level VGH2 for a total period of 9B. The number of sub-groups in this embodiment may be two or more, and is not limited to three, and the number of gate lines included in each of the sub-groups may be equaled or different. The number and size of the sub-groups are associated with the precision of touch sensing, and the number of sub-groups may be increased if a high sensing fineness is needed.

To prevent the TFTs with updated pixel information from being again turned on in the touch sensing mode, the high level VGH2 in the touch sensing mode (corresponding to FIG. 8 and FIG. 9) in the touch sensing mode is designed to be equal to or lower than the low level VGL1 in the frame update mode (corresponding to FIG. 7). For example, the low level VGL1 in the frame update mode is −6V, the high level VGH2 in the touch sensing mode is designed to be smaller than or equal to −6V and the low level VGL2 in the touch sensing mode is even lower than the high level VGH2 in the same mode, e.g., −16V. The difference between the high level VGH2 and the low level VGL2 in the touch sensing mode is associated with the sensitivity of touch sensing, and is not limited to the exemplary value of 10V of this embodiment.

Figure 10:
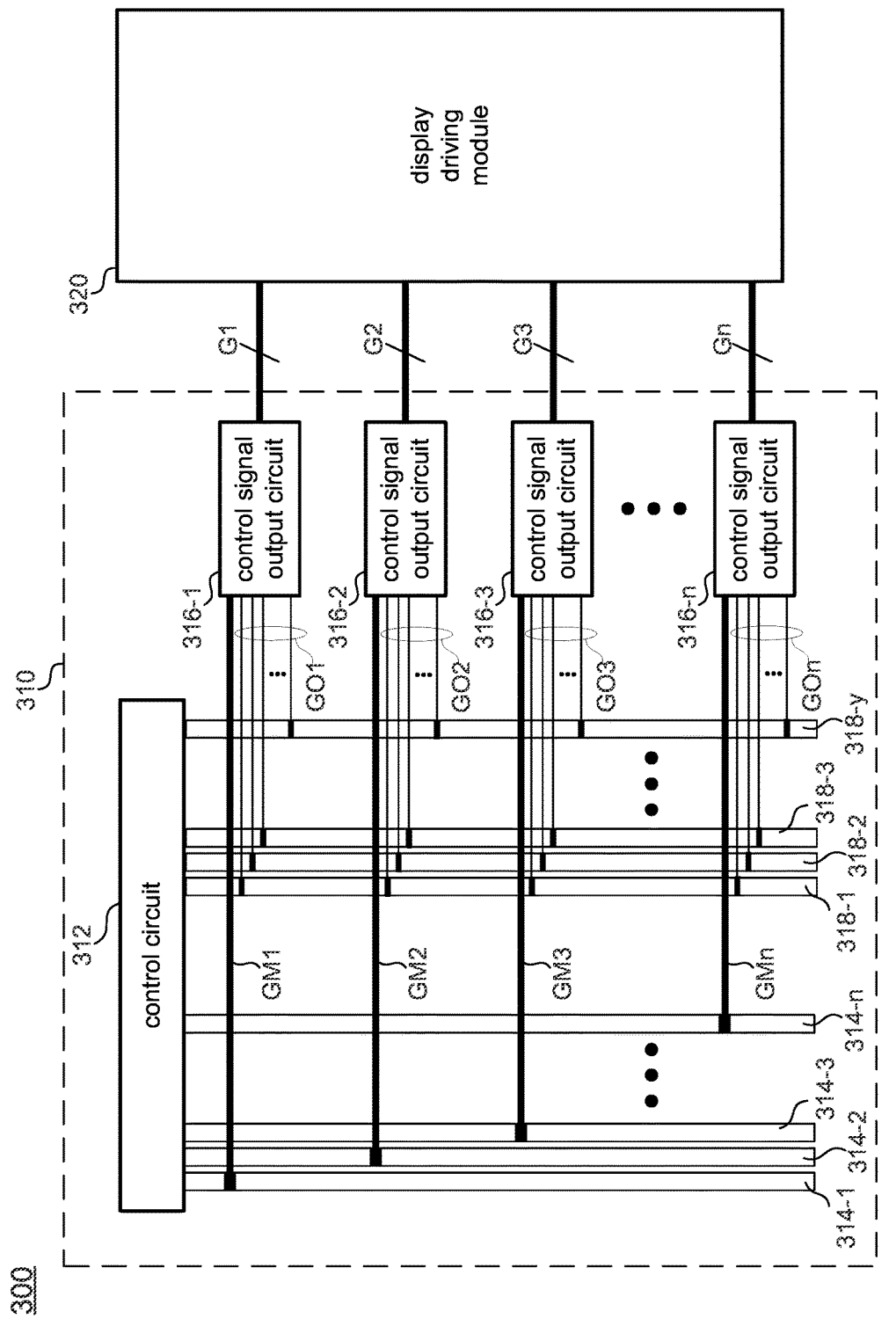
FIG. 10 is a schematic diagram of a touch control and display control module of a touch screen in a touch sensing mode according to another embodiment of the present invention.
Figure 11:
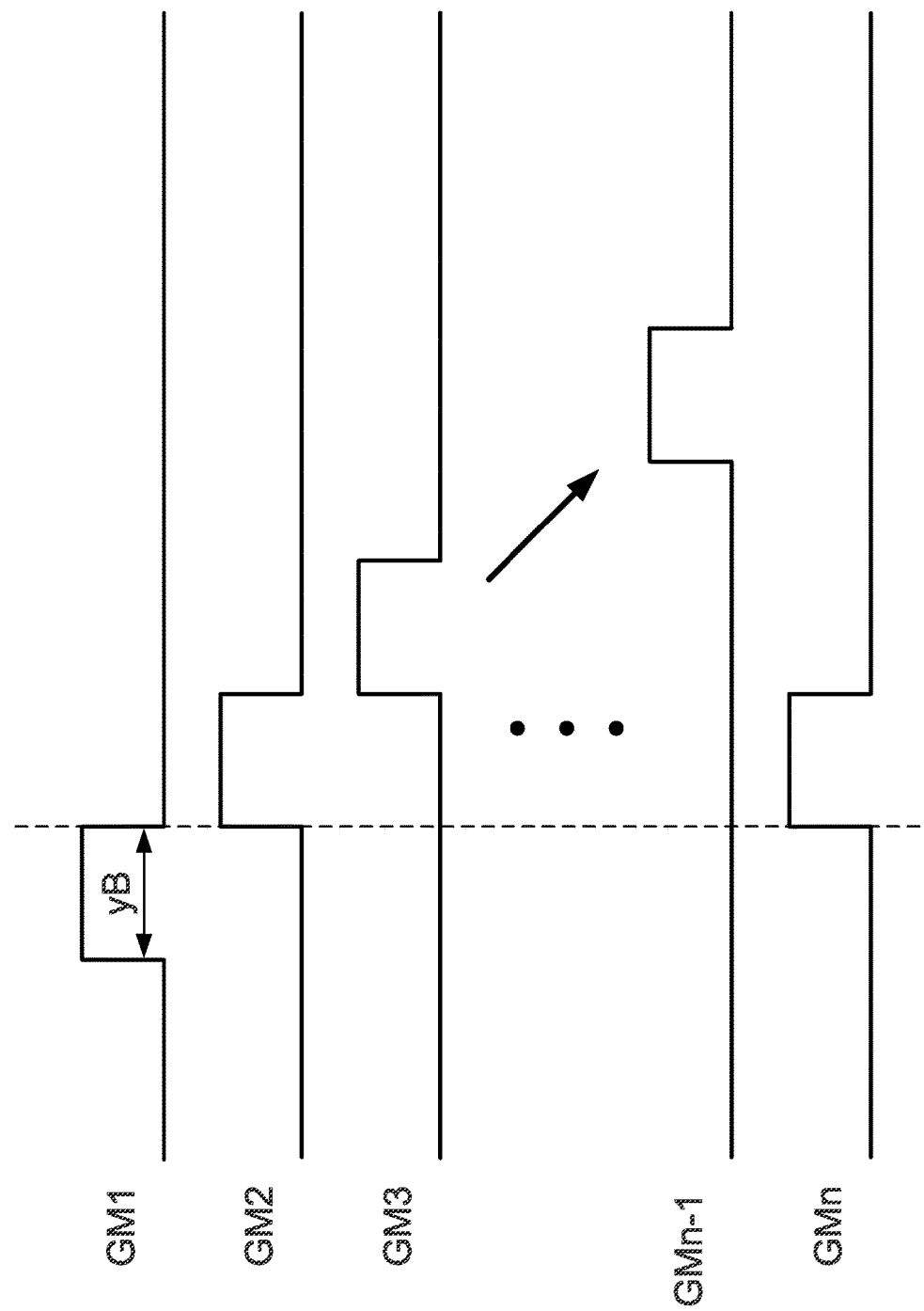
FIG. 11 is a timing diagram of a switch signal GO corresponding to the embodiment in FIG. 10.

FIG. 10 shows a schematic diagram of a touch control and display control module of a touch screen in a touch sensing mode according to another embodiment of the present invention. In the touch sensing mode, the touch control and display control module 310 may cause more than two control signal output circuits 316 to simultaneously apply a sensing voltage to the TFTs of all of the respective gate lines. For example, as shown, the control circuit 312 applies a sensing voltage on the TFTs of all of the respective gate lines corresponding to the control signal output circuit 316-2 and the control signal output circuit 316-$n$. Thus, non-adjacent or non-consecutive regions may be simultaneously detected in the touch sensing mode to enhance flexibilities of touch sensing. Such is one advantage of controlling the gate lines in a grouped manner of the present invention. FIG. 11 shows a timing diagram of the switch signal GM corresponding to the embodiment in FIG. 10. The switch signal GM2 and the switch signal GMn are simultaneously switched from a low level to a high level after the high level of the switch signal GM1 ends. When the high level of both of the switch signal GM2 and the switch signal GMn ends, the other switch signals GM3 to GMn−1 are sequentially switched to a high level.

Figure 12:
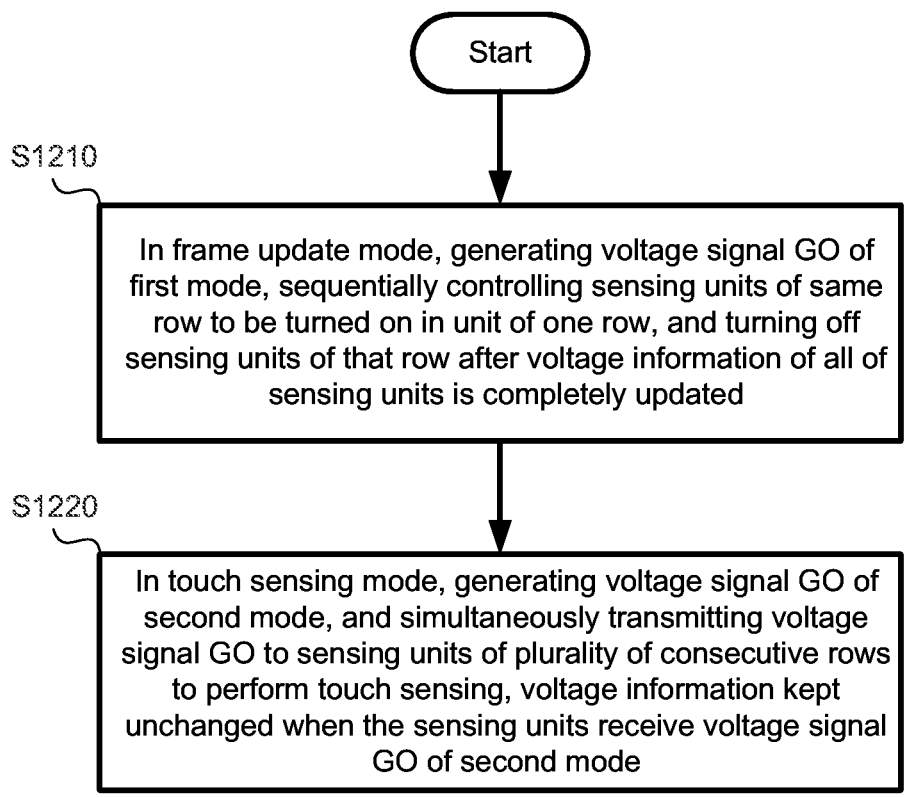
FIG. 12 is a flowchart of a control method for a touch screen according to an embodiment of the present invention.

FIG. 12 shows a flowchart of a control method for a touch screen according to an embodiment of the present invention. The control method is applied to a touch screen formed by a plurality of pixels. Each of the pixels includes at least one TFT and a capacitor. The TFTs and the capacitors are in charge of image display and touch sensing of the touch screen, and may thus be regarded as sensing units of the touch screen. These sensing units are arranged in a plurality of rows. Each of the sensing units stores voltage information associated with an image displayed by the touch screen. The control method is performed by the foregoing touch control and display control module 310 or an equivalent device. As shown in FIG. 12, the control method for a touch screen according to an embodiment of the present invention includes following steps.

In step S1210, in a frame update mode, a voltage signal GO of a first mode is generated. The voltage signal GO of the first mode causes the sensing units of the same row to be simultaneously turned on. When turned on, the sensing units receive pixel data DATA to update the voltage information. The voltage signal GO of the first mode controls the sensing units to be turned on for a predetermined period, and controls the sensing units of that row to be simultaneously turned off when the predetermined period is reached, i.e., after the voltage information of all of the sensing units is completely updated.

In step S1220, in a touch sensing mode, the voltage signal GO of a second mode is generated. The voltage signal GO of the second mode is simultaneously transmitted to the sensing units of a plurality of consecutive rows, and a voltage is applied to these sensing units to perform touch sensing. The voltage information is kept unchanged while these sensing units receive the voltage signal GO of the second mode. That is, in the touch sensing mode, the voltage information that has been updated in the previous step is not changed by the different voltage that the sensing units receive in the touch sensing mode. Thus, the image information is retained and the image is not distorted because of touch sensing.

As previously described, the voltage signal GO in FIG. 7 and the voltage signal GO in FIG. 8 and FIG. 9 have different high levels and low levels. More specifically, the high level VGH2 of the voltage signal GO in FIG. 8 and FIG. 9 is lower than the low level VGH1 of the voltage signal GO in FIG. 7 to prevent the voltage information from changing as the sensing units turn on in the touch sensing mode. Further, the control method of the present invention controls the gate lines in a grouped manner, and so one switch signal GM may be additionally used to control the time at which the voltage signal GO is outputted to the gate line groups. For example, for both the frame update mode and the touch sensing mode, the switch signals GM corresponding to different groups may be caused to sequentially switched to a high level for a period to have the gate lines of different groups to sequentially receive the voltage signal GO (as shown by the timing diagram in FIG. 6). However, in the touch sensing mode, the switch signals corresponding to different groups may be caused to simultaneously switch to a high level for a period, and the gate lines of more than two groups are caused to simultaneously receive the voltage signal GO (as shown in the timing diagram in FIG. 11). As shown in FIG. 10, touch sensing is performed in two non-consecutive display regions in the display driving module 320, thereby enhancing the flexibilities of touch sensing.

It should be noted that, the touch control and display control module 310 use bonding pads of the same gate lines in the frame update mode and in the touch sensing mode. Thus, compared to a conventional solution of using a gate control IC, the touch control and display control module 310 of the present invention involves no additional routing wires and bonding pads, hence helping reduce the border width of the touch screen.

One person having ordinary skill in the art can understand the implementation details and variations of the method in FIG. 12 according to the disclosure of the device in FIG. 3 to FIG. 11. While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch control and display control module of a touch screen, the touch screen comprising (n×y) rows of sensing units on a substrate, n and y being positive integers greater than 1, the touch control and display control module comprising:
    a control circuit, controlling the touch screen to operate in one of a frame update mode and a touch sensing mode;
    n first control lines, coupled to the control circuit;
    y second control lines, coupled to the control circuit; and
    n control signal output circuits, each of the n control signal output circuits comprising y control signal buffer units, wherein each of the n control signal output circuits is coupled to one of the n first control lines, each of the y control signal buffer units is coupled to both one of the y second control lines and one row of the sensing units, and each of the y control signal buffer units outputs a voltage signal to the one row of the sensing units to alternately operate the sensing units in one of the frame update mode and the touch sensing mode.

2. The touch control and display control module of a touch screen according to claim 1, wherein the control circuit correspondingly outputs a switch signal to each of the n control signal output circuits via one of the n first control lines, and outputs the y voltage signals via the y second control lines, the switch signal controls whether the control signal buffer units are to be turned on, and the control signal buffer units receive the y voltage signals and respectively output the y voltage signals to the corresponding y rows of the sensing units when turned on.

3. The touch control and display control module of a touch screen according to claim 2,
    wherein each of the sensing units has voltage information associated with an image displayed by the touch screen;
    wherein when the touch screen operates in the frame update mode, the voltage signal has a first potential difference to cause the sensing units to be turned off after being turned on for a period to update the voltage information; and
    wherein when the touch screen operates in the touch sensing mode, the voltage signal has a second potential difference that does not change the voltage information of the sensing units.

4. The touch control and display control module of a touch screen according to claim 2, wherein when the touch screen operates in the touch sensing mode, a level of the y voltage signals is kept unchanged in a period in which the control signal buffer units are turned on.

5. The touch control and display control module of a touch screen according to claim 2, wherein when the touch screen operates in the touch sensing mode, a level of the y voltage signals is changed in a period in which the control signal buffer units are turned on.

6. The touch control and display control module of a touch screen according to claim 2, wherein when the touch screen operates in the touch sensing mode, the control signal buffer units of at least two of the control signal output circuits corresponding to non-adjacent sensing units are simultaneously turned on according to the switch signal to simultaneously detect two non-adjacent regions of the touch screen in the touch sensing mode.

7. The touch control and display control module of a touch screen according to claim 2, wherein the control signal buffer units are made of a TFT, whose gate is coupled to the switch signal.

8. The touch control and display control module of a touch screen according to claim 3, wherein a high potential of the second potential difference is smaller than or equal to a low potential of the first potential difference.

9. The touch control and display control module of a touch screen according to claim 1, wherein the substrate is a glass substrate, and the first control lines, the second control lines and the control signal output circuits are made of a transparent material.

10. A touch control and display circuit of a touch screen for controlling image display and touch event sensing, comprising:
    a control module for controlling the touch screen to operate in one of a frame update mode and a touch sensing mode, comprising:

a control circuit, generating a first group of voltage signals and a second group of voltage signals for transmitting the first group of voltage signals;

a plurality of first control lines, coupled to the control circuit for transmitting the second group of voltage signals;

a plurality of second control lines, coupled to the control circuit; and a plurality of control signal output circuits, wherein, each of the control signal output circuits is coupled to one of the plurality of first control lines, each of the control signal output circuits is coupled to all of the plurality of second control lines, and each of the control signal output circuits is coupled to one row of the sensing units to output the first group of voltage signals and the second group of voltage signals; and a plurality of sensing units, coupled to the control module, arranged in a plurality of rows, wherein each of the sensing units has voltage information associated with an image displayed by the touch screen;

wherein, when the touch screen operates in the frame update mode, the control module outputs the first group of voltage signals, sequentially controls the sensing units of the same row to be turned on in a unit of one row, and turns off the sensing units of that row after the voltage information of all of the sensing units of that row is completely updated; and wherein, when the touch screen operates in the touch sensing mode, the control module outputs the second group of voltage signals, and causes the sensing units of a plurality of consecutive rows to simultaneously receive the second group of voltage signals to perform touch sensing, and the respective voltage information of the sensing units is kept unchanged while receiving the second group of voltage signals.

11. The touch control and display circuit of a touch screen according to claim 10, wherein a high potential level of the second group of voltage signals is smaller than or equal to a low potential level of the first group of voltage signals.

12. The touch control and display circuit of a touch screen according to claim 10, wherein the control circuit outputs a switch signal, the first group of voltage signals and the second group of voltage signals to a corresponding control signal output circuit, the switch signal controls whether to turn on the control signal buffer units via the first control lines, and the control signal buffer units receive the first group of voltage signals and the second group of voltage signals and output the first group of voltage signals or the second group of voltage signals to the sensing units when turned on.

13. The touch control and display circuit of a touch screen according to claim 12, wherein when the touch screen operates in the touch sensing mode, a level the second group of voltage signals is kept unchanged in a period in which the control signal buffer units are turned on.

14. The touch control and display circuit of a touch screen according to claim 12, wherein when the touch screen operates in the touch sensing mode, a level of the second group of voltage signals is changed in a period in which the control signal buffer units are turned on.

15. The touch control and display circuit of a touch screen according to claim 12, wherein when the touch screen operates in the touch sensing mode, at least two of the control signal buffer units are simultaneously turned on according to the switch signal.

16. The touch control and display circuit of a touch screen according to claim 10, wherein the touch screen is on a glass substrate, and the first control lines and the control signal output circuits are disposed by a transparent material.

17. A control method for a touch screen, for controlling image display and touch event sensing, the touch screen comprising a plurality of sensing units arranged in a plurality of rows, each of the sensing units having voltage information associated with an image displayed by the touch screen, the control method comprising:

providing a control circuit;

providing a plurality of first control lines coupled to the control circuit;

providing a plurality of second control lines coupled to the control circuit;

providing a plurality of control signal output circuits, wherein each of the control signal output circuits is coupled to one row of the sensing units to output a first group of voltage signals, each of the control signal output circuits is coupled to one of the first control lines for receiving one of the first group of voltage signals, and each of the control signal output circuits is coupled all of the second control lines for receiving a second group of voltage signals;

generating the first group of voltage signals by the control circuit in a frame update mode, transmitting the first group of voltage signals to one of control signal output circuits for sequentially controlling the sensing units of a corresponding row to be simultaneously turned on in a unit of one row, and turning off the sensing units of the corresponding row after the voltage information of all of the sensing units of that row is completely updated; and generating the second group of voltage signals by the control circuit in a touch sensing mode, simultaneously transmitting the second group of voltage signals to the sensing units of a plurality of rows to perform touch sensing, the respective voltage information of the sensing units kept unchanged when the sensing units receive the second group of voltage signals;

wherein the sensing units of the plurality rows are parallel to each other and included in a first display region and a second display region of the touch screen, and the first display region and the second display region are non-consecutive.

18. The control method for a touch screen according to claim 17, wherein a high potential level of the second group of voltage signals is lower than a low potential level of the first group of voltage signals.

* * * * *